US009516560B2

(12) United States Patent
Basu Mallick et al.

(10) Patent No.: US 9,516,560 B2
(45) Date of Patent: Dec. 6, 2016

(54) METHOD AND SYSTEM OF COMMUNICATING MEASUREMENT INFORMATION ASSOCIATED WITH A USER EQUIPMENT IN A WIRELESS COMMUNICATION NETWORK ENVIRONMENT

(75) Inventors: Prateek Basu Mallick, Bangalore (IN); Nitin Jain, Bangalore (IN); Shrinath Ramamoorthy, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 13/816,807

(22) PCT Filed: Aug. 16, 2011

(86) PCT No.: PCT/KR2011/006005
§ 371 (c)(1),
(2), (4) Date: Feb. 13, 2013

(87) PCT Pub. No.: WO2012/023784
PCT Pub. Date: Feb. 23, 2012

(65) Prior Publication Data
US 2013/0143573 A1    Jun. 6, 2013

(30) Foreign Application Priority Data

Aug. 14, 2010 (IN) .......................... 2347/CHE/2010

(51) Int. Cl.
*H04W 36/00* (2009.01)
*H04W 24/08* (2009.01)
*H04W 24/10* (2009.01)

(52) U.S. Cl.
CPC ......... *H04W 36/0072* (2013.01); *H04W 24/08* (2013.01); *H04W 24/10* (2013.01); *H04W 36/0055* (2013.01)

(58) Field of Classification Search
CPC ... H04W 36/12; H04W 36/18; H04W 36/30; H04W 36/32; H04W 80/04
USPC .......................... 455/436–439; 370/331–332
See application file for complete search history.

(56) References Cited

U.S. PATENT DOCUMENTS 8,644,252 B2 * 2/2014 Wager ............... H04W 36/0055
370/331
8,868,080 B2 * 10/2014 Wang .................... H04W 36/08
370/331

(Continued)

FOREIGN PATENT DOCUMENTS

| KR | 10-2000-0007771 A | 2/2000 |
| KR | 10-2010-0087821 A | 8/2010 |
| WO | 2010/062055 A2 | 6/2010 |

*Primary Examiner* — Cong Tran
(74) *Attorney, Agent, or Firm* — Jefferson IP Law, LLP

(57) ABSTRACT

A method and system of communicating measurement information associated with user equipment in a wireless communication network environment is provided. The method and system include a connection re-establishment request message is transmitted to a target base station associated with a target cell when a handover failure is detected. Then, a connection re-establishment response message is received from the target base station. Furthermore, a connection re-establishment complete message is transmitted to the target base station upon successful re-establishment of the wireless connection between the user equipment and the target base station, where the connection re-establishment complete message includes an indication of availability of measurement information associated with the handover failure with the user equipment. Additionally, a request to transmit the measurement information is received from the target base station. Moreover, the measurement information (e.g., radio conditions, RAT type, etc.) is transmitted to the target base station.

16 Claims, 7 Drawing Sheets

(56) References Cited

U.S. PATENT DOCUMENTS

| | | | |
|---|---|---|---|
| 2008/0139205 A1* | 6/2008 | Sayeedi | 455/436 |
| 2008/0167042 A1* | 7/2008 | Kitazoe | 455/436 |
| 2009/0061878 A1* | 3/2009 | Fischer | 455/436 |
| 2010/0130205 A1* | 5/2010 | Jung et al. | 455/435.2 |
| 2010/0173610 A1* | 7/2010 | Kitazoe | H04W 36/0038 455/411 |
| 2010/0234027 A1* | 9/2010 | Han et al. | 455/436 |
| 2010/0279695 A1* | 11/2010 | Amirijoo et al. | 455/438 |
| 2010/0317375 A1* | 12/2010 | Burbidge et al. | 455/458 |
| 2010/0330993 A1* | 12/2010 | Kone | 455/436 |
| 2011/0032815 A1* | 2/2011 | Kikuchi | 370/221 |
| 2011/0117905 A1* | 5/2011 | Huang | H04W 76/028 455/422.1 |
| 2011/0287805 A1* | 11/2011 | Kaminski et al. | 455/525 |
| 2012/0033629 A1* | 2/2012 | Yajima et al. | 370/329 |
| 2012/0064886 A1* | 3/2012 | Kim | H04W 24/04 455/423 |
| 2012/0216039 A1* | 8/2012 | Franklin et al. | 713/168 |
| 2014/0050197 A1* | 2/2014 | Legg et al. | 370/331 |

* cited by examiner

METHOD AND SYSTEM OF COMMUNICATING MEASUREMENT INFORMATION ASSOCIATED WITH A USER EQUIPMENT IN A WIRELESS COMMUNICATION NETWORK ENVIRONMENT

CROSS-REFERENCE TO RELATED APPLICATIONS

This application is a National Stage application under 35 U.S.C. §371 of an International application filed on Aug. 16, 2011 and assigned application No. PCT/KR2011/006005, and claims the benefit under 35 U.S.C. §365(b) of a Indian patent application filed on Aug. 14, 2010 in the Indian Intellectual Property Office and assigned Serial No. 2347/CHE/2010, the entire disclosure of which is hereby incorporated by reference.

BACKGROUND OF THE INVENTION

1. Field of the Invention

The present invention relates to wireless communications. More particularly, the present invention relates to method and system for communicating radio conditions with a base station in a wireless communication network environment.

2. Description of the Related Art

Typically, a wireless communication network environment includes one or more base stations deployed over a geographical region to provide wireless connectivity to user equipment within a coverage area of the base stations. Each base station provides various types of services (e.g., voice, data, multimedia services, etc.) that are operating within the geographical area served by the wireless communication network.

When a user equipment moves from location to another, distance from the presently serving base station may increase or decrease. Sometimes, the user equipment may move outside the coverage area of the presently serving base station and move into another base station's coverage area associated with the wireless communication network. As a consequence, signal conditions with respect to the presently serving base station may weaken. In order to provide uninterrupted wireless connectivity, support of a radio connection is transferred from the presently serving base station to another base station which can better serve the user equipment in its coverage area. This phenomenon is generally termed as 'hand-over.'

Ideally, the handover process is performed without any loss or disruption to the current communication path. However in practice, a handover event may fail while transferring support of a wireless connection from one base station to another (e.g., due to incorrect setting of mobility parameters), thereby disrupting current communication path between the user equipment and the wireless communication network.

Typically, user equipment may contain measurement information which indicates radio conditions when the handover failure has occurred and other related parameters, such as radio access technology (RAT) type. The radio conditions stored as measurement information may assist the base station in tuning network coverage and mobility parameters in order to avoid handover failure in future. However, the base station may not know which of the user equipment has the measurement information during handover failure. As a consequence, no measurement information is communicated with the base station for tuning network coverage and mobility parameters.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and system of communicating measurement information associated with user equipment in a wireless communication network environment.

In accordance with one aspect of the present invention, a method is provided. The method includes transmitting a connection re-establishment request message to a target base station associated with a target cell when a failure to handover a wireless connection from a source base station to a target base station is detected, receiving a connection re-establishment response message is received from the target base station in response to the connection re-establishment request message, transmitting a connection re-establishment complete message to the target base station upon successful re-establishment of the wireless connection between the user equipment and the target base station, wherein the connection re-establishment complete message indicates availability of measurement information associated with the handover failure with the user equipment. Additionally, a request to transmit the measurement information may be received from the target base station. The measurement information (e.g., radio conditions, Radio Access Technology (RAT) type, etc.) may be transmitted to the target base station.

In accordance with another aspect of the present invention, an apparatus is provided. The apparatus includes a processor, and memory coupled to the processor. The memory is configured to temporarily store instructions, that when executed by the processor, cause the processor to perform the method described above.

In accordance with another aspect of the present invention, a system is provided. The system includes a source base station associated with a first cell, a target base station associated with a second cell, and at least one user equipment. The at least one user equipment is configured to transmit a connection re-establishment request message to the target base station when a failure to handover a wireless connection from the source base station to the target base station is detected. The target base station is configured to send a connection re-establishment response message in response to the connection re-establishment request. The at least one user equipment is further configured to transmit a connection re-establishment complete message upon successful re-establishment of the wireless connection between the at least one user equipment with the target base station and to indicate availability of measurement information associated with the handover failure in the connection re-establishment complete message.

In accordance with another aspect of the present invention, a method is provided. The method includes sending a connection re-establishment request message to a base station when a radio link failure is detected, receiving a connection re-establishment response message is received from the base station, and transmitting a connection re-establishment complete message to the base station upon successful re-establishment of the wireless connection between the user equipment and the source base station. If the wireless connection is not successfully re-established, then the method further includes transmitting a connection request message to a base station associated with the wireless communication network, receiving a connection setup message is received from the base station in response to the connection request message, transmitting a connection setup complete message to the base station upon successful completion of the connection setup, wherein the connection setup complete message indicates the availability of the measurement information associated with the radio link failure with the user equipment. Additionally, a request to transmit the measurement information may be received from the target base station. The measurement information (e.g., radio conditions, RAT type, etc.) may be transmitted to the target base station.

In accordance with another aspect of the present invention, a method is provided. The method includes receiving a redirection message which indicates a frequency associated with a cell is received for establishing a wireless connection from a base station associated with the cell on the frequency indicated in the redirection message, detecting a failure to establish a wireless connection between a user equipment and the base station, sending a connection establishment request message to the base station for establishing a wireless connection between the user equipment and the base station receiving a connection establishment response message is received from the base station in response to the connection establishment request message, transmitting a connection establishment complete message to the base station upon successful establishment of the wireless connection between the user equipment and the base station, where the connection establishment complete message indicates availability of measurement information associated with the redirection failure with the user equipment. Additionally, a request to transmit the measurement information may be received from the base station. The measurement information may be transmitted to the base station based on the received request.

Other aspects, advantages, and salient features of the invention will be apparent to those skilled in the art from the following description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The present invention with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
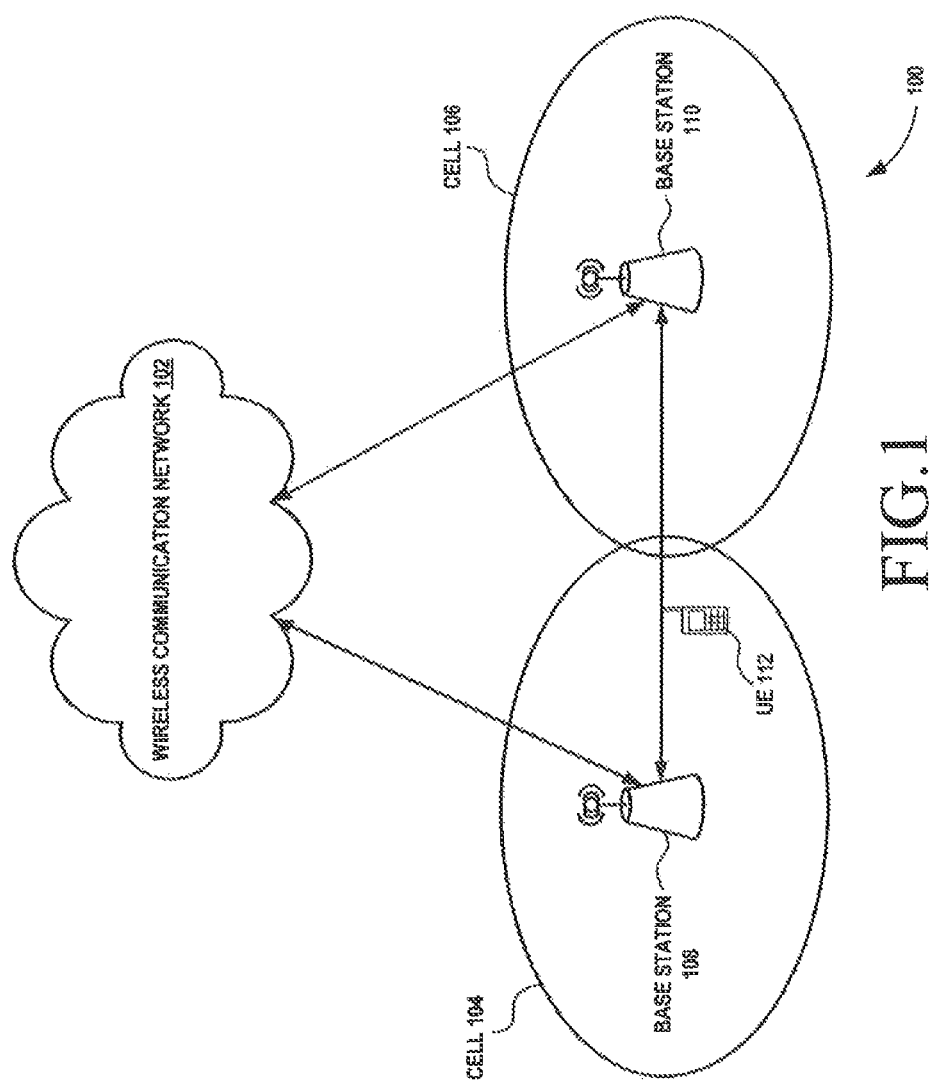
FIG. 1 illustrates a schematic diagram of an exemplary wireless communication network environment for communicating measurement information associated with User Equipment (UE), according to an exemplary embodiment of the present invention.

FIG. 1 illustrates a schematic diagram of an exemplary wireless communication network environment 100 for communicating measurement information associated with User Equipment (UE) 112, according to an exemplary embodiment of the present invention.

Referring to FIG. 1, the wireless communication network 102 may be connected to cells 104 and 106 being served by base stations 108 and 110 respectively. The base stations 108 and 110 communicate with each other and with the wireless communication network(s) 102 using appropriate communication interfaces.

In the wireless communication system 100, a wireless connection is established with the UE 112 (also sometimes referred to as mobile terminal, mobile station, mobile phone, and the like) in the cell 104 via a serving base station 108. As the UE 112 moves towards the cell 106, the UE 112 detects higher signal strength compared to the signal strength received from the serving base station 108. Accordingly, the UE 112 communicates measurement information to the serving base station 108. As a consequence, the serving base station 108 (hereinafter referred to as source base station) decides to initiate a handover of the wireless connection to the base station 110 (hereinafter referred to as target base station).

For the purpose of illustration, consider that the handover of wireless connection from the source base station 108 to the target base station 110 fails resulting in loss of wireless connection between the UE 112 and the wireless communication network 102. A handover failure may occur due to change of radio environment from the time measurements were performed, non-homogenous radio coverage, incorrect setting of network coverage and mobility parameters, lack of capacity in the cell 106, and other reasons.

When the UE 112 detects a failure to handover a wireless connection from the source base station 108 to the target base station 110, the UE 112 sends a connection re-establishment request message to re-establish a connection with the target base station 110. The target base station 110 sends a connection re-establishment response message in response to the connection re-establishment request message. If the wireless connection is re-established, the UE 112 transmits a connection re-establishment complete message to the target base station 110. According to an exemplary embodiment of the present invention, the UE 112 indicates availability of measurement information (also known as 'rlf' report) associated with measurements taken by the UE 112 during the handover failure in the connection re-establishment complete message. In this exemplary embodiment, an Information Element (IF) bit in the connection re-establishment message is set to true to indicate availability of measurement information with the UE 112.

Accordingly, the target base station 110 is aware that the UE 112 has the measurement information associated with the handover failure. In some exemplary embodiments, the target base station 110 may send a request to the UE 112 to transmit the measurement information. In these exemplary embodiments, the UE 112 transmits the measurement information to the target base station 110. For example, the measurement information may include a Radio Access Technology (RAT) type used at the time of handover failure and radio conditions determined during the handover failure. This measurement information may enable the target base station 110 to tune network coverage and mobility parameters (e.g., UE's topology, opportune time, etc.) to prevent any handover failures in future.

If the wireless connection is not re-established, the UE 112 may send a connection request message to a base station (e.g., the source base station 108, the target base station 110 or any other base station (not shown) connected to the wireless network 102). For the purpose of illustration, consider that the UE 112 sends a connection request to the source base station 108. In response, the UE 112 receives a connection setup message from the source base station 108. Accordingly, the UE 112 performs a connection setup to establish a wireless connection between the UE 112 and the source base station 108.

Figure 3A:
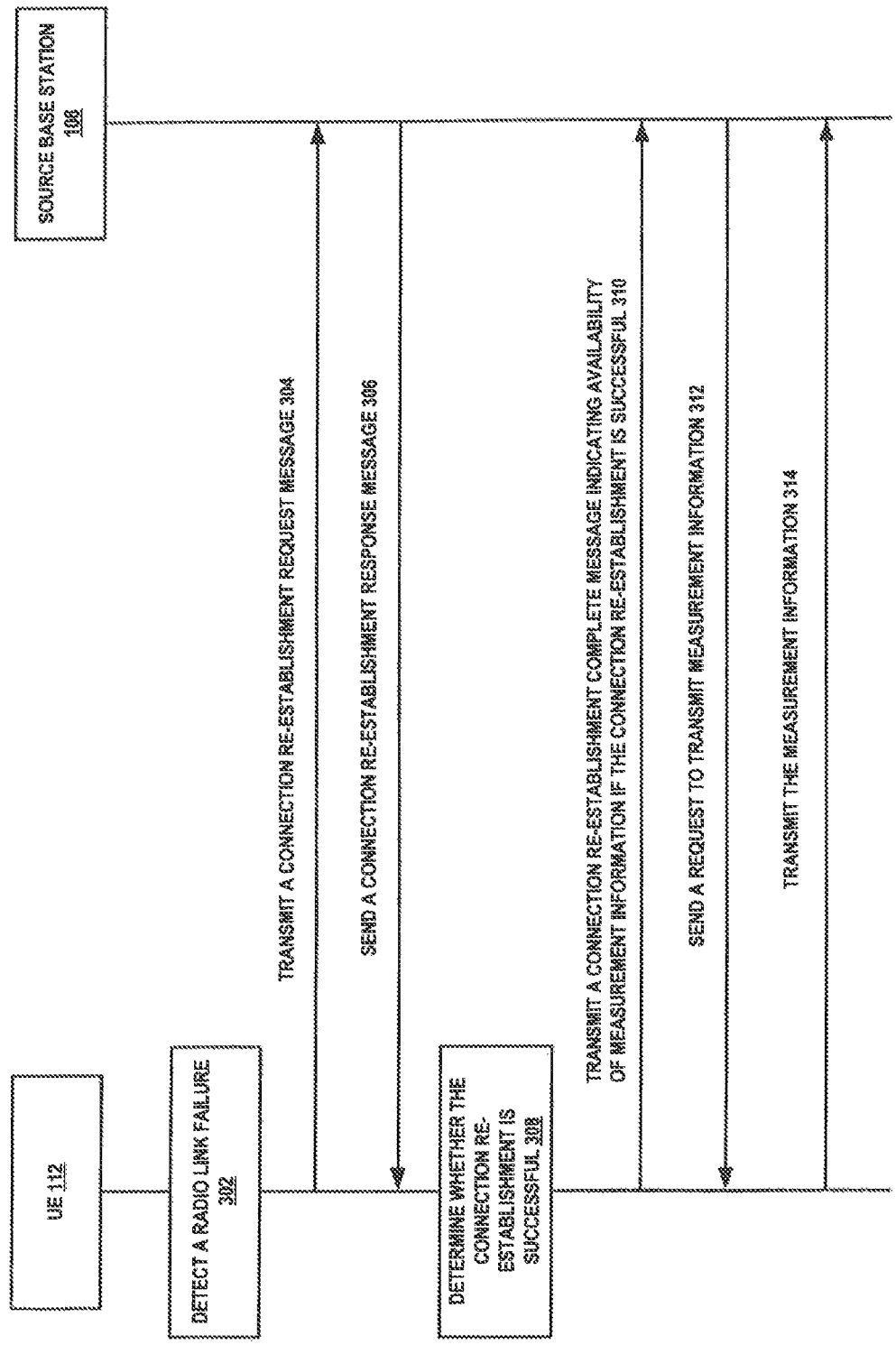
FIG. 3A is a process flowchart illustrating an exemplary method of communicating measurement information upon occurrence of a radio link failure according to an exemplary embodiment of the present invention.
Figure 3B:
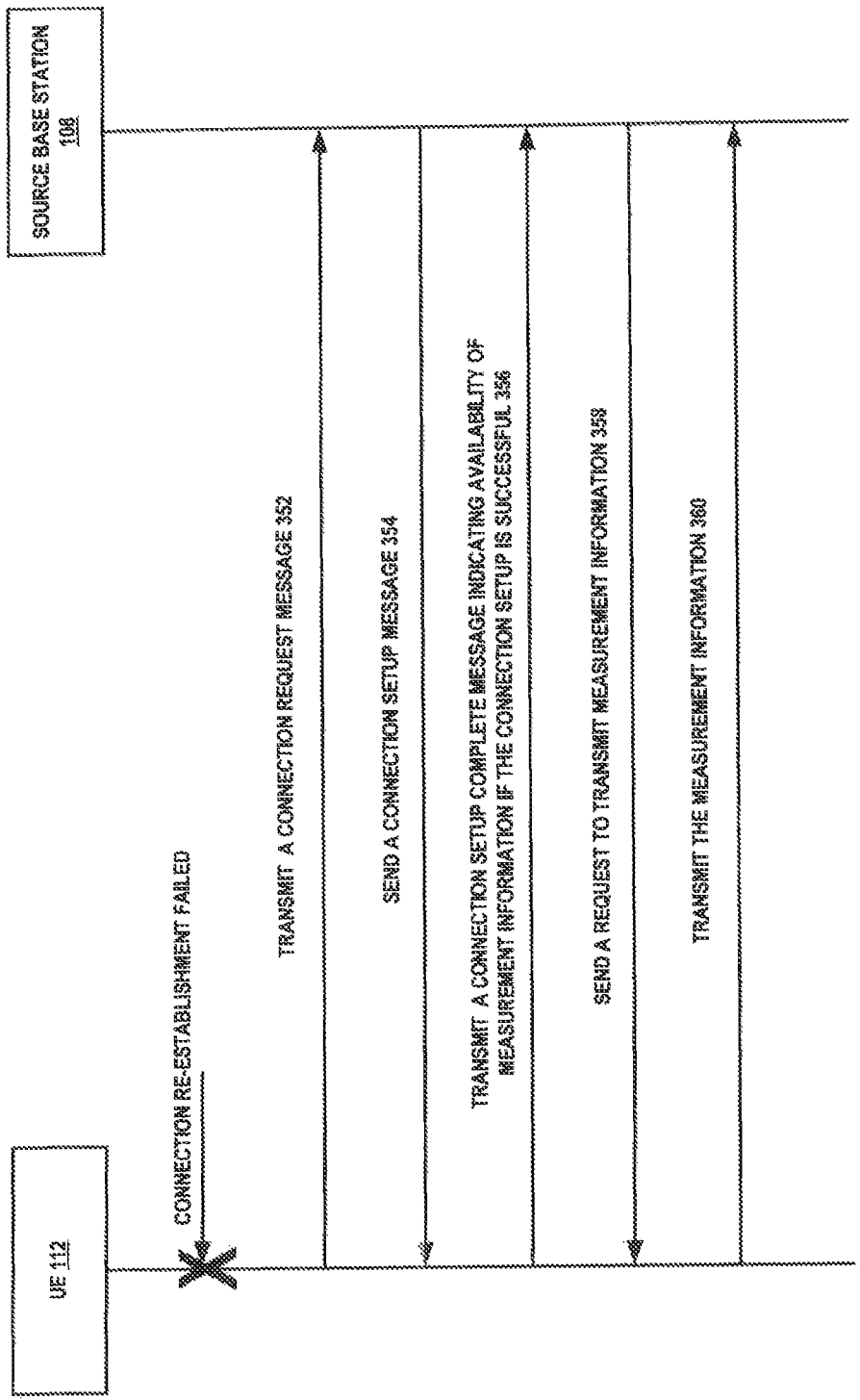
FIG. 3B is a process flowchart illustrating an exemplary method of communicating measurement information upon a radio link failure and when the connection re-establishment fails, according to another exemplary embodiment of the present invention.
Figure 4:
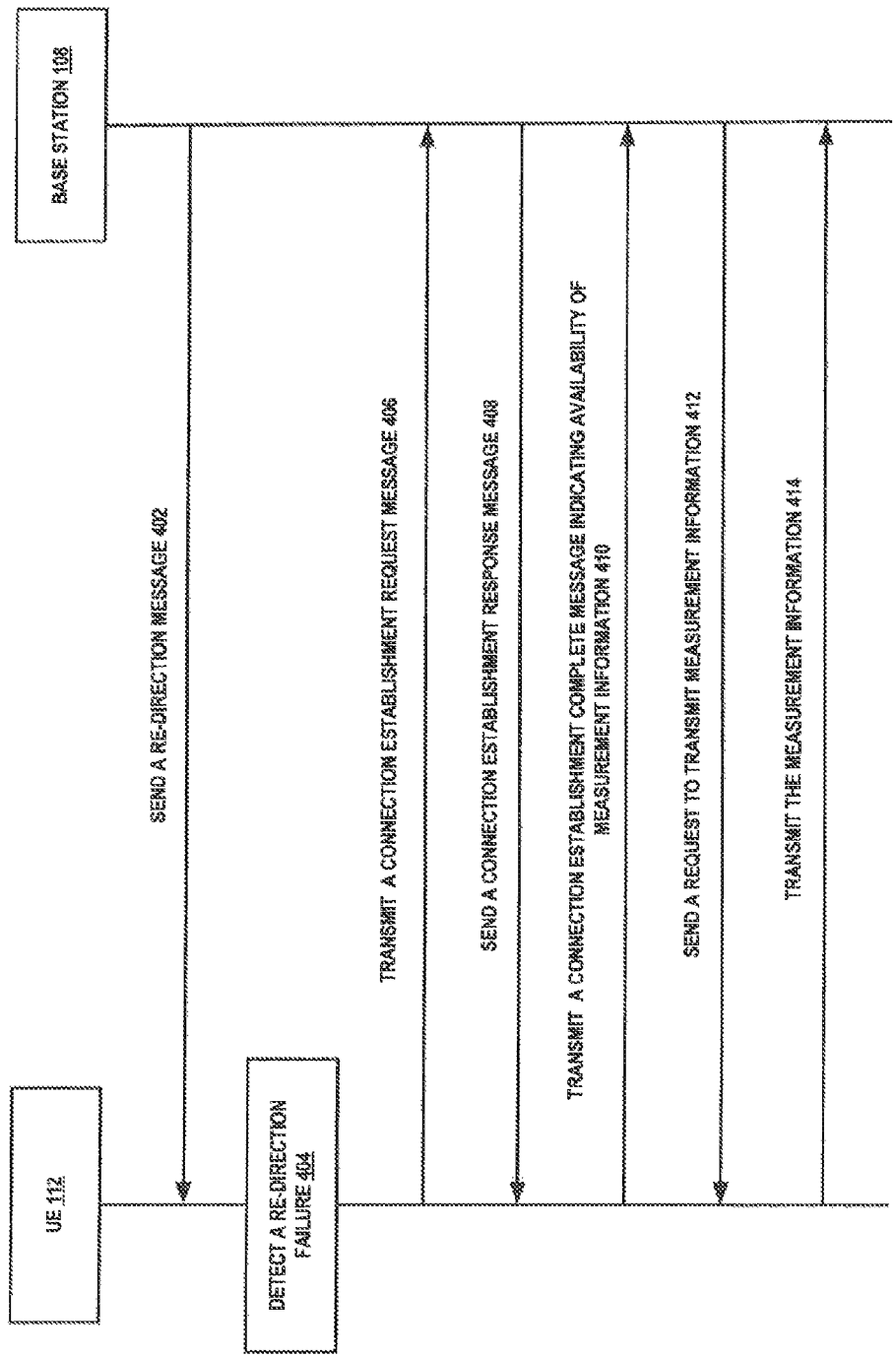
FIG. 4 illustrates a process flowchart of an exemplary method of communicating measurement information upon a redirection failure, according to another exemplary embodiment of the present invention.

Upon completion of the connection setup, the UE 112 sends a connection setup complete message to the base station 108. According to another exemplary embodiment, the UE 112 indicates availability of measurement information determined during the handover failure to the source base station 108. Based on the indication, the base station 108 may request the measurement information from the UE 112. Accordingly, the UE 112 may transmit the measurement information to the base station 108. The above process is described in greater detail with respect to FIGS. 2A and 2B. According to exemplary embodiments of the present invention, a similar procedure is implemented in event of radio link failure and re-direction failure as illustrated in FIGS. 3A and 3B, and FIG. 4.

Figure 2A:
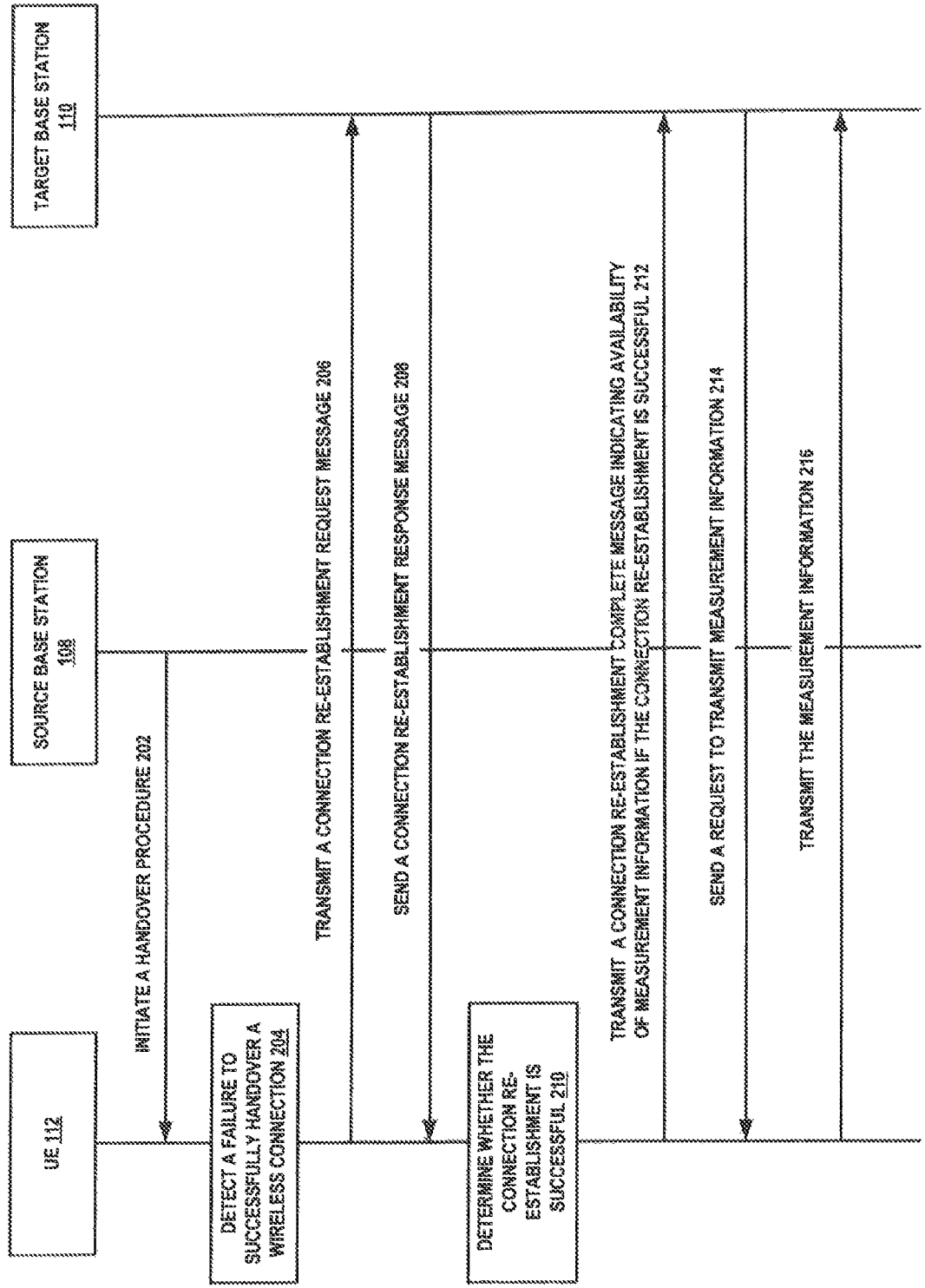
FIG. 2A is a process flowchart illustrating an exemplary method of communicating measurement information associated with a handover failure when a connection re-establishment is successful, according to an exemplary embodiment of the present invention.

FIG. 2A is a process flowchart 200 illustrating an exemplary method of communicating measurement information associated with a handover failure when a connection re-establishment is successful, according to an exemplary embodiment of the present invention.

Referring to FIG. 2A, at step 202, the source base station 108 initiates handover of the wireless connection to the target base station 110. At step 204, the UE 112 detects a failure to handover the wireless connection from the source base station 108 to the target base station 110.

At step 206, the UE 112 sends a connection re-establishment request message to re-establish the wireless connection with the target base station 110. At step 208, the target base station 110 sends a connection re-establishment response message in response to the connection re-establishment request message. At step 210, the UE 112 determines whether the wireless connection is successfully re-established between the UE 112 and the target base station 110.

If the wireless connection is successfully re-established, then at step 212, the UE 112 transmits a connection re-establishment complete message to the target base station 110. According to an exemplary embodiment of the present invention, the connection re-establishment message includes an indication of availability of measurement information associated with measurements taken by the UE 112 during the handover failure.

At step 214, the target base station 110 sends a request to the UE 112 to transmit the measurement information. At step 216, the UE 112 transmits the measurement information to the target base station 110. For example, the measurement information includes a RAT type used at the time of handover failure and radio conditions determined during the handover failure. Accordingly, the target base station 110 may tune network coverage and mobility parameters based on the measurement information.

Figure 2B:
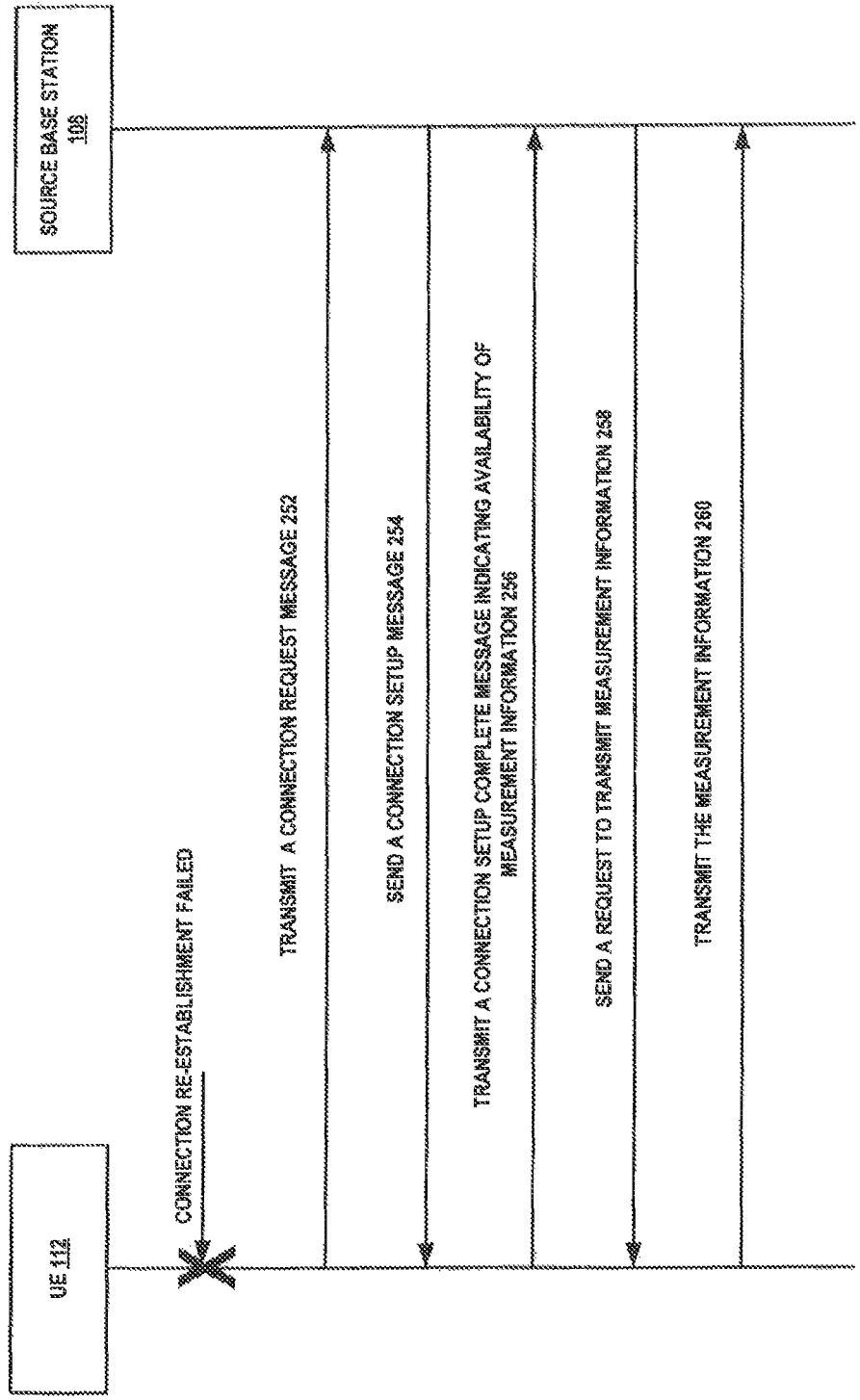
FIG. 2B is a process flowchart illustrating an exemplary method of communicating measurement information associated with a handover failure when the connection re-establishment fails, according to an exemplary embodiment of the present invention.

FIG. 2B is a process flowchart illustrating an exemplary method of communicating measurement information associated with a handover failure when a connection re-establishment fails, according to an exemplary embodiment of the present invention.

Referring to FIG. 2B, if the wireless connection is not re-established, then at step 252, the UE 112 sends a connection request message to a base station (e.g., the source base station 108, the target base station 110 or any other base station (not shown) connected to the wireless network 102). For the purpose of illustration, consider that the UE 112 sends a connection request to the source base station 108.

At step 254, the UE 112 receives a connection setup message from the source base station 108. At step 256, the UE 112 performs a connection setup to establish a wireless connection between the UE 112 and the source base station 108. At step 258, the UE 112 sends a connection setup complete message to the source base station 108. The connection setup complete message includes an indication of availability of measurement information determined during the handover failure. At step 260, the source base station 108 sends a request to the UE 112 to transmit the measurement information. The UE 112 then transmits the measurement information to the source base station 108. For example, the source base station 108 may tune network coverage and mobility parameters based on the measurement information. Although, the above steps are described with reference to handover failure, one can envision that the above described process may be implemented upon occurrence of other types of mobility failures.

FIG. 3A is a process flowchart 300 illustrating an exemplary method of communicating measurement information upon occurrence of a radio link failure according to an exemplary embodiment of the present invention.

Referring to FIG. 3A, at step 302, the UE 112 detects a radio link failure between the source base station 108 and the UE 112. A radio link failure may occur due to bad L1 conditions, radio link transmission failure, or radio access channel failure. At step 304, the UE 112 sends a connection re-establishment request message to re-establish a wireless connection with the source base station 108. At step 306, the source base station 108 sends a connection re-establishment response message in response to the connection re-establishment request message. At step 308, the UE 112 determines whether the wireless connection is successfully re-established between the UE 112 and the source base station 108.

If the wireless connection is successfully re-established, then at step 310, the UE 112 transmits a connection re-establishment complete message indicating availability of measurement information to the source base station 108. At step 312, the source base station 108 sends a request to the UE 112 to transmit the measurement information. At step 314, the UE 112 transmits the measurement information to the source base station 108.

FIG. 3B is a process flowchart illustrating an exemplary method of communicating measurement information upon a radio link failure and when the connection re-establishment fails, according to another exemplary embodiment of the present invention.

Referring to FIG. 3B, if the wireless connection is not re-established, steps 352-362 are performed. At step 352, the UE 112 sends a connection request message to a base station (e.g., the source base station 108 or any other base station (not shown) connected to the wireless network 102). For the purpose of illustration, consider that the UE 112 sends a connection request to the source base station 108.

At step 354, the UE 112 receives a connection setup message from the source base station 108. At step 356, the UE 112 performs a connection setup to establish a wireless connection between the UE 112 and the source base station 108. At step 358, the UE 112 sends a connection setup complete message to the source base station 108, where the connection setup complete message includes an indication of availability of measurement information determined during the radio link failure. At step 360, the source base station 108 sends a request to the UE 112 to transmit the measurement information. The UE 112 then transmits the measurement information to the source base station 108. For example, the source base station 108 may tune network coverage and radio link parameters (e.g., network topology, transmission power, transmission direction, etc.) based on the measurement information to prevent further radio link failures.

The radio link failure and the handover failure are not linked to each other and may occur independently at different points in time. Consider a scenario in which a radio link between the source base station 108 and the UE 112 has failed and a UE timer (T1) is started by the UE 112. Also, consider that the target base station 110 initiates handover of a wireless connection from the source base station 108 to the target base station 110 based on measurement reports from the UE 112 while the timer T1 is running. In such a case, the timer T1 is stopped automatically as the handover procedure is initiated. According to the related art, no measurement information associated with the radio link failure is being communicated to the wireless network 102 due to termination of the timer T1. However, according to exemplary embodiments of the present invention, if a handover failure occurs subsequent to the radio link failure, the UE 112 indicates availability of measurement information in a connection re-establishment message or a connection setup complete message such that the wireless network 102 is aware of the availability of the measurement information with the UE 112.

Consider another scenario in which the target base station 110 initiates handover of a wireless connection from the source base station 108 to the target base station 110 based on measurement reports from the UE 112 and the UE 112 starts timer (T2) associated with handover. Also, consider that radio link between the UE 112 and the source base station 108 fails while the timer 12 is running. In such a case, the UE 112 will not start timer T1 for initiating radio link failure procedures as the timer T2 is running. According to the related art, no measurement information associated with the radio link failure is being communicated to the wireless network 102. However, according to exemplary embodiments of the present invention, if a handover failure occurs subsequent to the radio link failure, the UE 112 indicates availability of measurement information in a connection re-establishment message or a connection setup complete message such that the wireless network 102 is aware of the availability of the measurement information with the UE 112.

FIG. 4 illustrates a process flowchart of an exemplary method of communicating measurement information upon a redirection failure, according to an exemplary embodiment of the present invention.

Referring to FIG. 4, at step 402, a redirection message which includes a frequency associated with a cell for establishing a wireless connection is received from a base station (e.g., the source base station 108). At step 404, a failure to establish a wireless connection between the UE 112 and the source base station 108 associated with the cell on the frequency indicated in the redirection message is detected. A redirection failure is a failure to successfully move to the target cell/frequency/RAT indicated by the source base station 108 in the redirection message.

At step 406, the UE 112 sends a connection establishment request message to the source base station 108. At step 408, the UE 112 receives a connection establishment response message from the source base station 108 in response to the connection establishment request message. At step 410, the UE 112 performs a connection establishment procedure to establish a wireless connection between the UE 112 and the source base station 108. At step 412, the UE 112 sends a connection establishment complete message to the source base station 108, where the connection establishment complete message contains an indication of availability of measurement information of measurements collected during the redirection failure. At step 414, the source base station 108 sends a request to the UE 112 to transmit the measurement information. The UE 112 then transmits the measurement information to the source base station 108. For example, the source base station 108 may tune network coverage and redirection parameters (e.g., network topology, transmission power, transmission direction, etc.) based on the measurement information to prevent further redirection failure.

Figure 5:
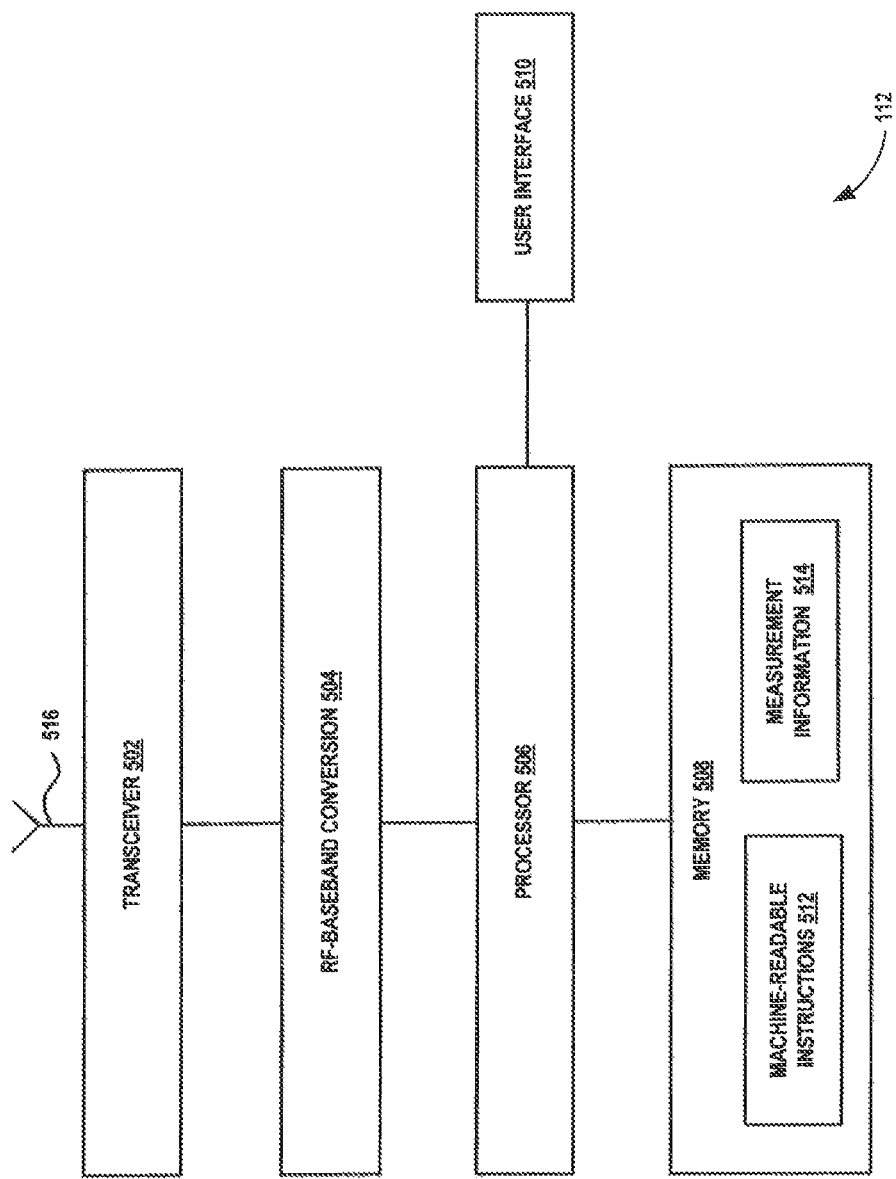
FIG. 5 is a functional block diagram of a UE according to an exemplary embodiment of the present invention.

FIG. 5 illustrates a functional block diagram of a UE according to an exemplary embodiment of the present invention.

Referring to FIG. 5, the UE 112 includes a radio transceiver 502 coupled to an antenna 516 for transmitting and receiving information (e.g., measurement information and other messages) over a wireless interface. The radio transceiver 502 is also coupled to the radio frequency (RF) conversion circuitry 504 for converting the received radio signals to baseband frequency and for converting baseband signals to be transmitted to radio frequency. The RE conversion circuitry 504 is coupled to a processor 506. The processor 506 is coupled to a user interface 510 such as keypad, display, speaker, microphone, USB port, etc. The processor 506 is also coupled to memory 508 which includes machine-readable instructions 512 and measurement reports 514 containing measurement information.

The instructions 512 are executed by the processor 506 for communicating measurement reports 514 to the wireless network 102 upon a handover failure, radio link failure, re-direction failure and other types of mobility failures. The processor 506 performs steps illustrated in FIGS. 1, 2A, 2B, 3A, 3B, and/or 4 upon execution of the instructions 512 stored in the memory 510, in accordance with one or more exemplary embodiments of the present invention. According to one exemplary embodiment, the processor 506 indicates availability of measurement reports 514 in a connection re-establishment complete message, connection setup complete message, connection establishment complete message or any other message transmitted via the transceiver 502.

Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a non-transitory machine readable medium. For example, the various electrical structure and methods may be embodied using transistors, logic gates, and electrical circuits, such as application specific integrated circuit.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method comprising:
transmitting a connection request message to a base station associated with a cell in response to one of a radio link failure and a handover failure being detected;
receiving a connection setup message from the base station in response to the connection request message; and
transmitting a connection setup complete message to the base station upon a successful establishment of the wireless connection with the base station,
wherein the connection setup complete message includes information indicating an availability of measurements related to the one of the radio link failure and the handover failure.

2. The method of claim 1, further comprising:
receiving a request to transmit measurement information from the base station; and
transmitting the measurement information to the base station based on the received request.

3. The method of claim 2, wherein the measurement information comprises radio conditions determined during the handover failure and a radio access technology type associated with the handover failure.

4. The method of claim 2, wherein the measurement information comprises radio conditions determined during the radio link failure and a radio access technology type associated with the radio link failure.

5. An apparatus comprising:
a processor; and
a memory coupled to the processor and configured to temporarily store instructions, that when executed by the processor, cause the processor to perform a method comprising:
transmitting a connection request message to a base station associated with a cell in response to one of a radio link failure and a handover failure being detected;
receiving a connection setup response message from the base station in response to the connection request message; and
transmitting a connection setup complete message to the base station upon a successful establishment of the wireless connection with the base station,
wherein the connection setup complete message includes information indicating an availability of measurements related to the one of the radio link failure and the handover failure.

6. The apparatus of claim 5, wherein the method further comprises:
receiving a request to transmit measurement information from the base station, and
transmitting the measurement information to the base station based on the received request.

7. The apparatus of claim 6, wherein the measurement information comprises radio conditions determined during the handover failure and a radio access technology type associated with the handover failure.

8. The apparatus of claim 6, wherein the measurement information comprises radio conditions determined during the radio link failure and a radio access technology type associated with the radio link failure.

9. A method comprising:
receiving a connection request message from user equipment in response to one of a radio link failure and a handover failure being detected;
transmitting a connection setup message to the user equipment in response to the connection request message; and
receiving a connection setup complete message from the user equipment upon a successful establishment of a wireless connection with the user equipment,
wherein the connection setup complete message includes information indicating an availability of measurements related to one of the radio link failure and the handover failure.

10. The method of claim 9, further comprising:
transmitting a request to transmit measurement information to the user equipment; and
receiving the measurement information from the user equipment.

11. The method of claim 10, wherein the measurement information comprises radio conditions determined during the handover failure and a radio access technology type associated with the handover failure.

12. The method of claim 10, wherein the measurement information comprises radio conditions determined during the radio link failure and a radio access technology type associated with the radio link failure.

13. An apparatus comprising:

a processor; and a memory coupled to the processor and configured to temporarily store instructions, that when executed by the processor, cause the processor to perform a method comprising:

receiving a connection request message from user equipment in response to one of a radio link failure and a handover failure being detected;

transmitting a connection setup message to the user equipment in response to the connection request message; and receiving a connection setup complete message from the user equipment upon a successful establishment of a wireless connection with the user equipment, wherein the connection setup complete message includes information indicating an availability of measurements related to one of a radio link failure and a handover failure.

14. The apparatus of claim 1, further comprising:

transmitting a request to transmit measurement information to the user equipment; and receiving the measurement information from the user equipment.

15. The apparatus of claim 14, wherein the measurement information comprises radio conditions determined during the handover failure and a radio access technology type associated with the handover failure.

16. The apparatus of claim 14, wherein the measurement information comprises radio conditions determined during the radio link failure and a radio access technology type associated with the radio link failure.

\* \* \* \* \*